US011671345B2

(12) United States Patent
Kommula et al.

(10) Patent No.: US 11,671,345 B2
(45) Date of Patent: Jun. 6, 2023

(54) SELF-EXPANSION OF A LAYER 3 NETWORK FABRIC

(71) Applicant: Nicira, Inc., Palo Alto, CA (US)

(72) Inventors: Raja Kommula, Cupertino, CA (US); Rajendra Yavatkar, Saratoga, CA (US); Thayumanavan Sridhar, Sunnyvale, CA (US)

(73) Assignee: Nicira, Inc., Palo Alto, CA (US)

( * ) Notice: Subject to any disclaimer, the term of this patent is extended or adjusted under 35 U.S.C. 154(b) by 0 days.

(21) Appl. No.: 17/096,087

(22) Filed: Nov. 12, 2020

(65) Prior Publication Data

US 2021/0067433 A1 Mar. 4, 2021

Related U.S. Application Data

(63) Continuation of application No. 15/647,656, filed on Jul. 12, 2017, now Pat. No. 10,848,413.

(51) Int. Cl.
*H04L 45/02* (2022.01)
*H04L 49/10* (2022.01)
(Continued)

(52) U.S. Cl.
CPC .............. *H04L 45/02* (2013.01); *H04L 41/12* (2013.01); *H04L 49/10* (2013.01);
(Continued)

(58) Field of Classification Search
CPC ......... H04L 45/02; H04L 41/12; H04L 49/10; H04L 43/0817; H04L 45/04; H04L 45/24;
(Continued)

(56) References Cited

U.S. PATENT DOCUMENTS 9,973,380 B1 * 5/2018 Mittal ..................... H04L 43/06
2003/0115364 A1 * 6/2003 Shu ..................... H04L 63/0464
709/246

(Continued)

*Primary Examiner* — Joseph L Greene

(57) ABSTRACT

The technology disclosed herein enables an L3 network fabric including one or more spine switches having a leaf-spine topology to be self-expanded. In a particular embodiment, a method provides transferring one or more probe messages from each of the spine switches. The probe messages detect whether new computing nodes have been attached to the communication network. The method further provides receiving a reply to at least one of the probe messages. The reply identifies a new computing node that is not yet included in the L3 fabric. In response to the reply, the method provides confirming physical network interfaces of the spine switches indicate valid connections to one or more new leaf switches of the new computing node, using L3 discovery protocols to ensure the connections conform to the leaf-spine topology, and transferring probe packets between the spine switches and leaf switches, including the new leaf switches, of computing nodes connected thereto to confirm configuration of all connections between the spine switches and the leaf switches of the computing nodes. Moreover, the method provides configuring L3 protocols for routing communications exchanged with the new computing node.

22 Claims, 6 Drawing Sheets

(51) Int. Cl.
*H04L 41/12* (2022.01)
*H04L 49/1515* (2022.01)
*H04L 45/24* (2022.01)
*H04L 45/00* (2022.01)
*H04L 45/48* (2022.01)
*H04L 43/0817* (2022.01)

(52) U.S. Cl.
CPC .......... *H04L 43/0817* (2013.01); *H04L 45/04* (2013.01); *H04L 45/24* (2013.01); *H04L 45/26* (2013.01); *H04L 45/48* (2013.01); *H04L 45/54* (2013.01); *H04L 49/1523* (2013.01)

(58) Field of Classification Search
CPC ......... H04L 45/26; H04L 45/48; H04L 45/54; H04L 49/1523
See application file for complete search history.

(56) References Cited

U.S. PATENT DOCUMENTS

| | | | |
|---|---|---|---|
| 2006/0098670 A1* | 5/2006 | Voit | H04L 41/0253 370/535 |
| 2013/0124717 A1* | 5/2013 | Stevens | H04L 61/5007 709/224 |
| 2015/0092609 A1 | 4/2015 | Shah et al. | |
| 2015/0304164 A1 | 10/2015 | Goetje | |
| 2017/0317919 A1* | 11/2017 | Fernando | H04L 41/0806 |
| 2018/0041396 A1* | 2/2018 | Li | H04L 41/12 |
| 2018/0041443 A1* | 2/2018 | Xiao | H04L 67/564 |
| 2018/0191600 A1* | 7/2018 | Hecker | H04L 41/12 |
| 2018/0331955 A1 | 11/2018 | Ju et al. | |
| 2018/0367388 A1 | 12/2018 | Pani et al. | |
| 2018/0367395 A1* | 12/2018 | Harneja | H04L 41/0866 |

\* cited by examiner

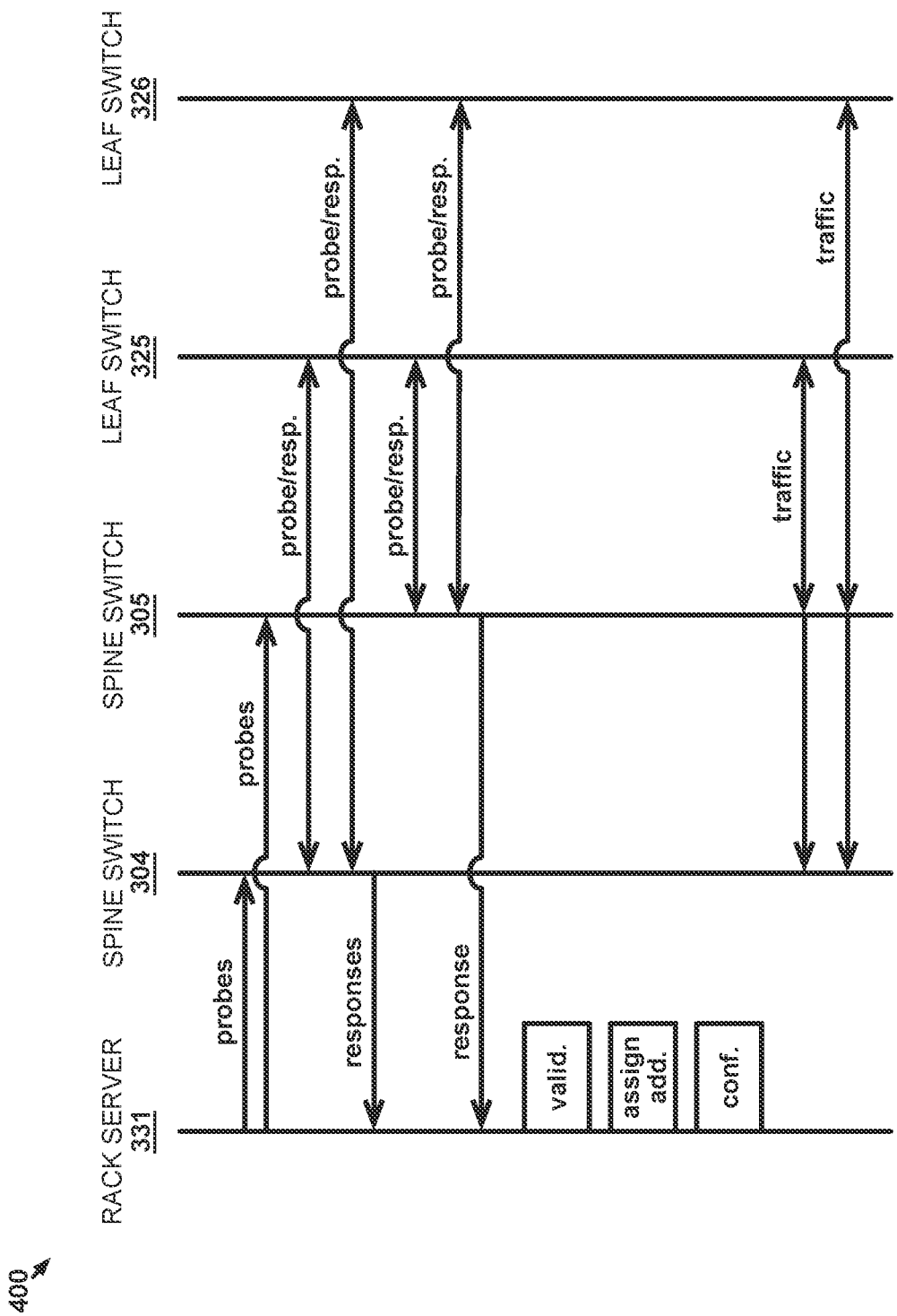

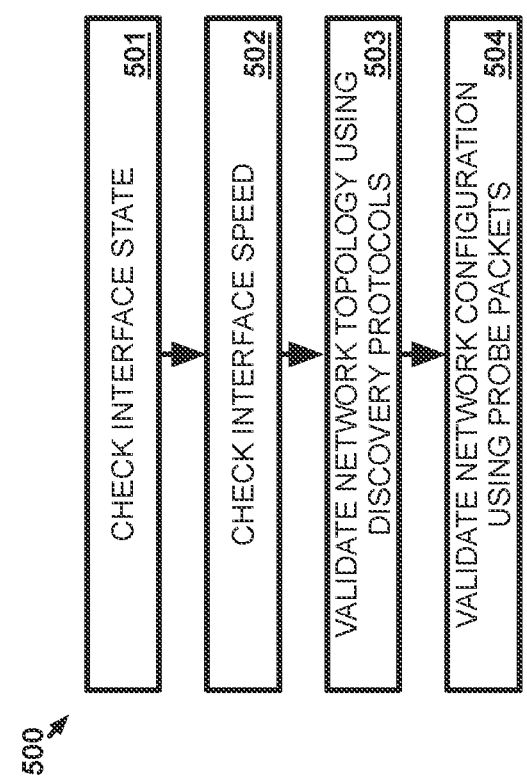

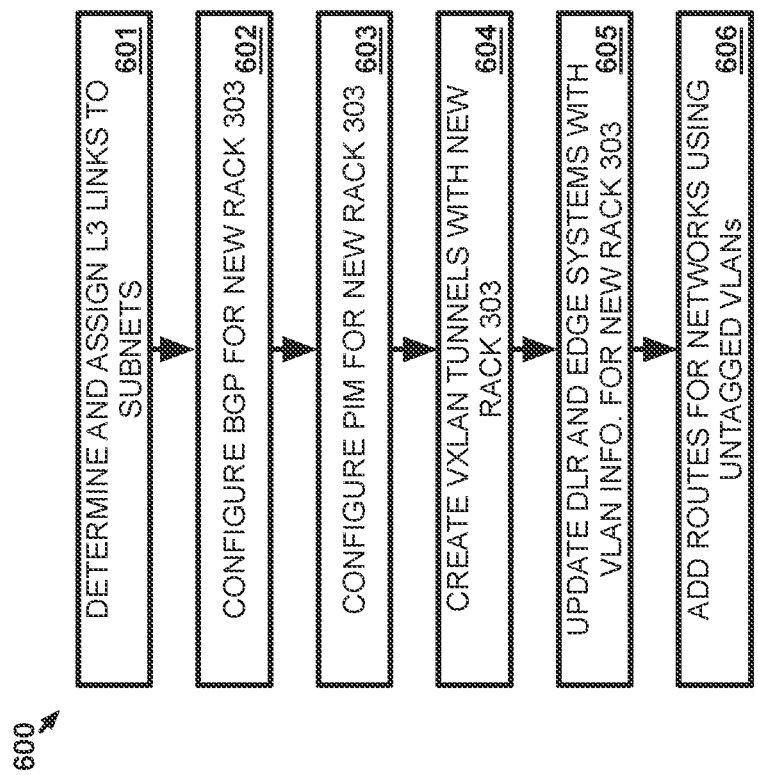

SELF-EXPANSION OF A LAYER 3 NETWORK FABRIC

RELATED APPLICATIONS

This application is a continuation of U.S. patent application Ser. No. 15/647,656, entitled "SELF-EXPANSION OF A LAYER 3 NETWORK FABRIC," filed Jul. 12, 2017, which is hereby incorporated by reference in its entirety.

TECHNICAL BACKGROUND

Leaf-spine network architecture uses spine switches to connect computing nodes, such as server racks, via leaf switches at those computing nodes. Each leaf switch is connected to each spine switch, which allows for consistency in communication delay and latency for communications between any two computing nodes. That is, communications from one communication node to another will always traverse only one spine switch when travelling between the leaf switches of those computing nodes. Dynamic Layer 3 (L3) routing may be used between the spine and leaf switches to account for dynamic network conditions. Since each spine switch is connected to each leaf switch, the dynamic L3 routing (e.g., Equal-Cost Multipath routing) may be used for load balancing communications being handled by any given switch.

When a new computing node and its leaf switch(es) are added to an existing leaf-spine network, that computing node must first be connected properly to conform to the leaf-spine topology. Only once the proper connections have been accomplished can the new computing node be incorporated into the L3 fabric of the leaf-spine network. When the leaf-spine network is part of a hyper converged infrastructure, such as the VMware Cloud Foundation™ (VCF), many different L3 protocols need to be configured to ensure the new computing node is fully integrated into that infrastructure. As such, manual configuration of a new computing node in a leaf-spine network can be time consuming and error prone.

SUMMARY

The technology disclosed herein enables an L3 network fabric including one or more spine switches having a leaf-spine topology to be self-expanded. In a particular embodiment, a method provides transferring one or more probe messages from each of the spine switches. The probe messages detect whether new computing nodes have been attached to the communication network. The method further provides receiving a reply to at least one of the probe messages. The reply identifies a new computing node that is not yet included in the L3 fabric. In response to the reply, the method provides confirming physical network interfaces of the spine switches indicate valid connections to one or more new leaf switches of the new computing node, using L3 discovery protocols to ensure the connections conform to the leaf-spine topology, and transferring probe packets between the spine switches and leaf switches, including the new leaf switches, of computing nodes connected thereto to confirm configuration of all connections between the spine switches and the leaf switches of the computing nodes. Moreover, the method provides configuring L3 protocols for routing communications exchanged with the new computing node.

In some embodiments, the method provides assigning network addresses to the new computing node. The network addresses are included in an L3 address space reserved for newly added computing nodes. In those embodiments, before assigning the network addresses the new computing node may be assigned known network addresses and wherein the probe messages are transferred to the known network addresses.

In some embodiments, confirming physical network interfaces of the spine switches indicate valid connections comprises checking interface state and interface speed for each of the physical network interfaces.

In some embodiments, configuring the L3 protocols comprises determining a number of new subnets needed for the new computing node based on information identified while validating that the new computing node is properly connected and assigning the new subnets to L3 links between the spine switches and the leaf switches of the new computing node.

In some embodiments, configuring the L3 protocols comprises configuring the Border Gateway Protocol (BGP) for the new computing node and assigning a BGP Autonomous System (AS) number to the new computing node. In these embodiments, the new computing node exports network information for private networks within the new computing node over BGP.

In some embodiments, configuring the L3 protocols comprises configuring Protocol Independent Multicast (PIM) for the new computing node.

In some embodiments, configuring the L3 protocols comprises creating Virtual Extensible Local Area Network (VXLAN) tunnels between the new computing node and one or more other computing nodes connected to the spine switches.

In some embodiments, configuring the L3 protocols comprises updating edge systems of the communication network and a distributed logical router for the communication network with Virtual Local Area Network (VLAN) information used with respect to the new computing node.

In some embodiments, configuring the L3 protocols comprises partitioning a subnet including the new computing node and one or more other computing nodes connected to the spine switches into one partition network for each computing node and creating one or more routes between the partition network of the new computing node and the partition networks of the one or more other computing nodes. In these embodiments, the subnet routes are used for transporting packets without Virtual Local Area Network (VLAN) tags between computing nodes.

In another embodiment, a system is provided having one or more computer readable storage media and a processing system operatively coupled with the one or more computer readable storage media. Program instructions stored on the one or more computer readable storage media, when read and executed by the processing system, direct the processing system to transfer one or more probe messages from each of the spine switches. The probe messages detect whether new computing nodes have been attached to the communication network. The program instructions further direct the processing system to receive a reply to at least one of the probe messages, wherein the reply identifies a new computing node that is not yet included in the L3 fabric. In response to the reply, the program instructions direct the processing system to confirm physical network interfaces of the spine switches indicate valid connections to one or more new leaf switches of the new computing node, use L3 discovery protocols to ensure the connections conform to the leaf-spine topology, and transfer probe packets between the spine switches and leaf switches, including the new leaf switches, of computing nodes connected thereto to confirm configuration of all connections between the spine switches and the leaf switches of the computing nodes. Also, the program instructions direct the processing system to configure L3 protocols for routing communications exchanged with the new computing node.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 4 illustrates an operational scenario of the other computing environment to self-expand an L3 network fabric.

FIG. 5 illustrates a method of operating the other network environment to self-expand an L3 network fabric.

FIG. 6 illustrates another method of operating the other network environment to self-expand an L3 network fabric.

DETAILED DESCRIPTION

The implementations provided herein allow for the self-expansion of a leaf-spine L3 network fabric. The network topology of a leaf-spine network fabric includes L3 spine switches with L3 connections to leaf switches at computing nodes being networked by the leaf-spine network. Communications between the computing nodes are transferred through a spine switch via each computing node's leaf switches. One feature of the leaf-spine network topology is that communications between any two computing nodes need only traverse one of the spine switches in transit. The leaf-spine network topology therefore allows for the delay and latency for communications between any two computing nodes to be predictable and consistent across the entire leaf-spine network. With that in mind, any newly added computing node to the leaf-spine network must be connected and configured in a manner that conforms to the leaf-spine network topology. If the new computing node does not include the proper physical connection arrangement, then the new computing node cannot be properly added to the L3 leaf-spine network topology.

Figure 1:
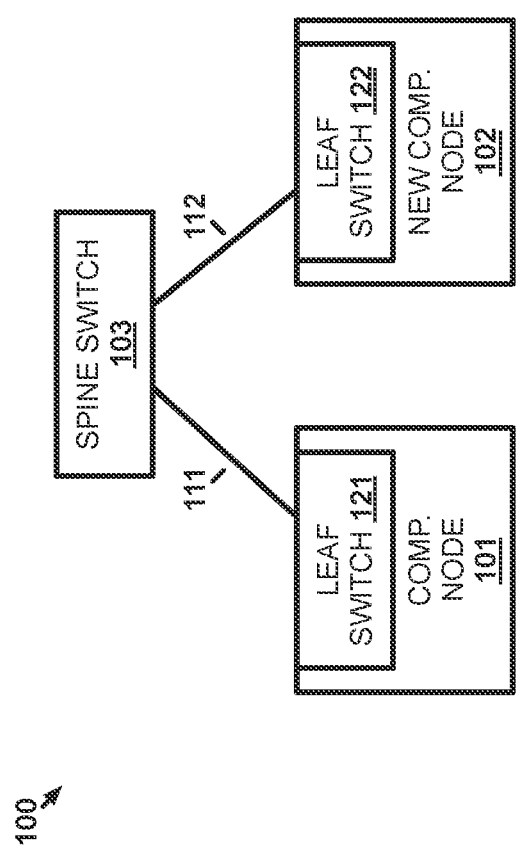
FIG. 1 illustrates a network environment for self-expanding an L3 network fabric.

FIG. 1 illustrates network environment 100 for self-expanding an L3 network fabric. Network environment 100 includes computing node 101, new computing node 102, spine switch 103, leaf switch 121, and leaf switch 122. Leaf switch 121 and spine switch 103 communicate over communication link 111. Leaf switch 122 and spine switch 103 communicate over communication link 112. Communication links 111 and 112 comprise physical communication links over which L3 network communications travel between physical spine and leaf switches. In this example, only one spine switch is shown, although network environment 100 could include any number of spine switches. Also, for simplicity, only one existing computing node is shown, although any number of computing nodes may be connected to spine switch 103. Similarly, each computing node is shown to only have a single leaf switch therein while other examples may include one or more additional leaf switches in each computing node for increased data throughput and/or redundancy reasons.

Figure 2:
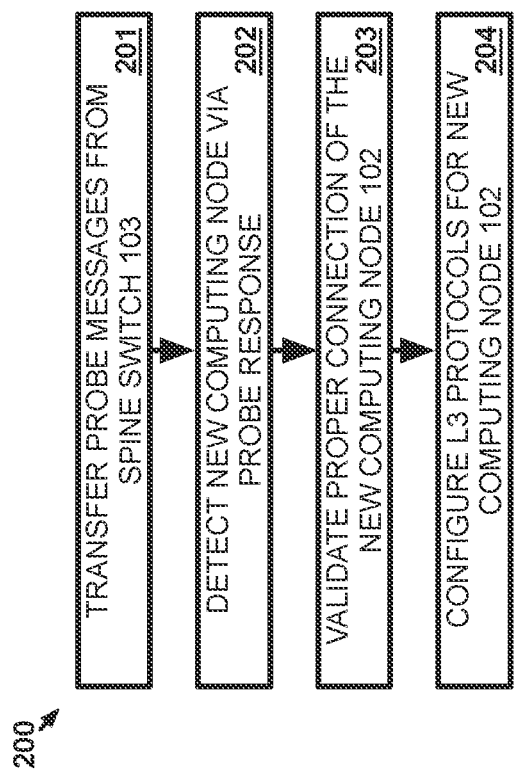
FIG. 2 illustrates a method of operating the network environment to self-expand an L3 network fabric.

FIG. 2 illustrates method 200 of operating network environment 100 to self-expand an L3 network fabric. In particular, method 200 provides a method in which new computing node 102 may be integrated into the leaf-spine network topology that already exists in network environment 100 with at least computing node 101 and spine switch 103. It should be understood that new computing node 102 is only referred to as being "new" because new computing node 102 is not part of leaf-spine network topology at the onset of method 200. New computing node 102 need not be a newly manufactured computing node. Computing node 101 and new computing node 102 may include one or more computing elements therein, such as computer systems (e.g., rack servers) and/or network devices (e.g., firewalls, edge systems, etc.) that exchange communications via leaf switch 121, leaf switch 122, and spine switch 103. In one example of method 200, new computing node 102 may be added to network environment 100 to provide additional computing capacity.

To add new computing node 102 to the L3 network fabric between the spine and leaf switches of network environment 100, method 200 provides transferring probe messages from spine switch 103 directed to L3 network addresses of potential new computing nodes (201). The probe messages may originate from spine switch 103 or may originate in a computing system of computing node 101 for distribution through spine switch 103. The probe messages are transferred periodically to ensure new computing node 102 can be detecting in a reasonably short amount of time upon being physically connected to spine switch 103. The network addresses to which the probe messages are sent are a known finite set of network addresses that will be assigned to new computing node 102, or any other new computing node, for the new computing node to be automatically detected by the probe messages. Otherwise, new computing nodes not assigned such known addresses will not be detectable via the probe messages.

In this example, a response to a probe message is received from leaf switch 122 of new computing node 102, which indicates that a new computing node is located at the network address from which the response was received (202). Spine switch 103 may be configured to receive and handle the response itself or the response is received in and handled by a computing system within computing node 101, such as a computing system from which the probe messages originated. Regardless of whether spine switch 103 or computing node 101 handles the response, method 200 provides that element validating whether leaf switch 122 is properly connected to spine switch 103 for incorporation into the leaf-spine network fabric of network environment 100 (203).

In particular, the validation of the connection between spine switch 103 and leaf switch 122 may include confirming that the physical network interface of spine switch 103 that is connected to leaf switch 122 provides a proper connection between leaf switch 122 and spine switch 103. The confirmation of the physical network interface may include checking the interface's state and the interface's speed to ensure the connection with leaf switch 122 can support at a quality of service necessary for inclusion in the leaf-spine fabric. Additionally, L3 discovery protocols may be used to ensure the connections confirmed above adhere to the network environment 100's leaf-spine network topology. That is, the L3 discovery protocols are used to discover the neighbors of each spine switch and leaf switch in network environment 100 to ensure each leaf switch is separated from any other leaf switch by a single spine switch. In this example, since there is only one spine switch and two leaf switches, leaf switch 121 and leaf switch 122 are the only neighbors of spine switch 103, so the leaf-spine topology is confirmed. Furthermore, additional probe messages may be transferred between the leaf switches and the spine switches to ensure all connections between the leaf switches and the spine switches remain intact for the leaf-spine topology. While this step may be trivial in this example, the examples below involve more complex leaf-spine topologies.

Once the L3 connections with leaf switch 122 of new computing node 102 have been validated, method 200 is able to provide configuring L3 protocols of network environment 100 for use with communications exchanged with new computing node 102 (204). Examples of such L3 configurations are described in more detail with respect to FIG. 6. In some examples, since the initial L3 network address(es) used by new computing node 102 may be reserved solely for detection of new computing nodes, a new L3 network address(es) may be assigned to new computing node 102 for use in network environment 100. Upon address reassignment, new computing node 102 will not interfere with subsequent periodic probe messages described with respect to step 201.

Figure 3:
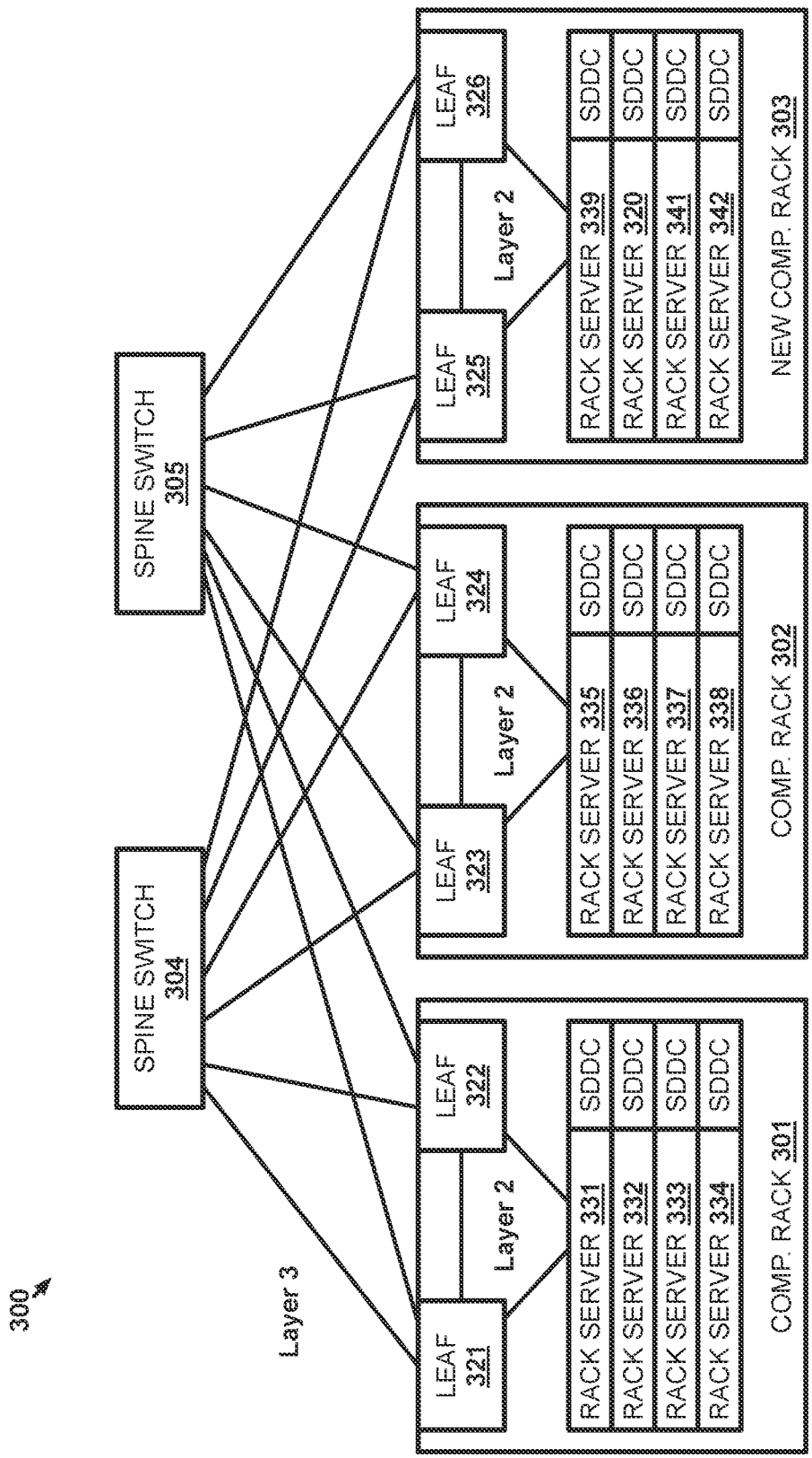
FIG. 3 illustrates another network environment for self-expanding an L3 network fabric.

FIG. 3 illustrates network environment 300 for self-expanding an L3 network fabric. Network environment 100 includes computing rack 301, computing rack 302, new computing rack 303, spine switch 304, and spine switch 305. Computing rack 301 includes leaf switch 321, leaf switch 322, and rack servers 331-334. Computing rack 302 includes leaf switch 323, leaf switch 324, and rack servers 335-338. New computing rack 303 includes leaf switch 325, leaf switch 326, and rack servers 339-342.

Each computing rack includes two leaf switches for exchanging communications with rack servers therein. The leaf switches facilitate the exchange of communications of the rack servers within the computing rack using a Layer 2 (L2) network while the leaf switches exchange communications between computing racks through the L3 leaf-spine network of spine switch 304 and spine switch 305. Each rack server comprises a server system designed for mounting within a computing rack and may include various computer elements, such as a microprocessor, Random Access Memory, non-volatile memory (e.g., flash, hard disk, etc.), communication interface (for communicating with leaf switches), or other components—including combinations thereof. In this example, the rack servers implement a Software Defined Data Center (SDDC) as a hyper converged infrastructure and, therefore, include SDDC manager software modules executing thereon for facilitating the virtual elements (e.g., virtual machines, containers, etc.) of the SDDC that are also executing on the rack servers. As shown, east-west network traffic between computing racks via the spine and leaf switches is exchanged over a L3 fabric. Network traffic within the computing racks (i.e., between the rack servers therein) is exchanged at Layer 2 (L2). Thus, leaf switches 321-326 are both L3 and L2 capable switches depending on whether the communications are internal or external to the computing rack.

FIG. 4 illustrates operational scenario 400 of the other computing environment to self-expand an L3 network fabric. In scenario 400, computing rack 301 and computing rack 302 are already incorporated into the L3 fabric of the leaf-spine network while new computing rack 303 is being added. At the onset of scenario 400, leaf switches 325 and 326 have each been connected to spine switch 304 and spine switch 305 in accordance with the requirements of a leaf-spine network topology. The SDDC manager executing on rack server 331 is charged with the detection and configuration of new computing racks to network environment 300, although any SDDC manager already incorporated into the leaf-spine network may be used instead.

Scenario 400 begins with rack server 331, at the direction of its SDDC manager, periodically generating and transferring probe messages to L3 network addresses in a known pool of network addresses. That is, the SDDC manager is provided with network addresses that will be used by new computing nodes when first attached to the leaf-spine network. There may be any finite number of network addresses in the pool with a lesser number of network addresses allowing fewer resources to be used when sending the probe messages. The probe messages in this example are directed through both spine switch 304 and spine switch 305 to account for the fact that a new computing rack's leaf switches will be connected to both spine switch 304 and spine switch 305. To receive the probe messages, upon being connected, the SDDC manager of a rack server within new computing rack 303 (e.g., rack server 339) operates in a server mode and creates a TCP socket on a known port and using one of the network addresses in the address pool. Likewise, the SDDC manager of rack server 331 opens a client socket and sends its client signature in the probe messages. Upon receiving one of the probe messages, the SDDC manager in new computing rack 303 sends a response with its server signature to rack server 331. The response is shown going through both leaf switch 325 and leaf switch 326 of new computing rack 303 but by be a single response through one of leaf switches 325 and 326.

Upon receiving the response from new computing rack 303, the SDDC manager in rack server 331 proceeds with validation of new computing rack 303's connection to the leaf-spine network. FIG. 5 illustrates method 500 of validating that new computing rack 303 has the necessary physical connections for incorporation into the leaf-spine network's L3 fabric. Method 500 provides the SDDC manager of rack server 331 validating the physical connections between spine switches 304-305 and leaf switches 325-326. The validation of physical connections includes checking the state of spine switch 304 and spine switch 305's interfaces with leaf switch 325 and leaf switch 326 (501). That is, the state of the interfaces will indicate that spine switch 304 has connections to both leaf switch 325 and leaf switch 326 and spine switch 305 likewise has connections to both leaf switch 325 and leaf switch 326. If one of the aforementioned connections does not exist, then new computing rack 303 lacks the connections necessary for inclusion in the leaf-spine network and that will need to be remedied by a user before new computing rack 303 can be added to the L3 fabric. Additionally, the speed of the interfaces may also be checked (e.g., by measuring the speed of test traffic between the spine switches and the leaf switches) (502). A slow interface speed below a predefined threshold may indicate an issue on the physical connection between switches that needs to be checked by a user before new computing rack 303 can be added to the L3 fabric.

Method 500 continues by validating the leaf-spine network topology on the physical connections (503). The topology is validated using link layer discovery protocols, such as the Link Layer Discovery Protocol (LLDP) or the Cisco Discovery Protocol (CDP). While the previous steps confirmed that physical links exist at spine switch 304 and spine switch 305's interfaces, the protocols used in step 503 ensure that the physical links are connected to the correct ports on spine switch 304, spine switch 305, leaf switch 325, and leaf switch 326. If the topology is not validated, then a user will have to address the topology issues before validation can continue. From there, method 500 provides using probe packets to validate the leaf-spine configuration of the network now that new computing rack 303 has been added (504). The probe packets are sent between spine switch 304 and spine switch 305 and leaf switches 325 and 326 in all possible source switch and destination switch combinations (i.e., with one switch of the group being the source and another switch of the group being the destination). Likewise, the probe packets are sent over all possible paths between the source and destination switches. For example, a probe packet between spine switch 304 and spine switch 305 can pass through leaf switch 325 or leaf switch 306. Two probe packets are therefore transferred on each respective path. Should any of the probe packets fail to reach its intended destination, then confirmation of the networks configuration will fail and need to be addressed by a user.

Referring back to scenario 400, after new computing rack 303 has been validated by the SDDC of rack server 331, new network addresses are assigned to new computing rack 303 for use by rack servers 339-342 therein. The new network addresses are not in the pool of network addresses used for detecting new computing racks, as described above. Therefore, once new computing rack 303 is assigned new network addresses, the latter addresses can continue to be used during the transfer of periodic probe messages to discover additional new computing racks beyond new computing rack 303. New computing rack 303 will not receive those probe messages due to new computing rack 303 no longer using the network addresses to which those probes are directed.

Once new computing rack 303 has been assigned the network addresses it will be using going forward in network environment 300, the L3 based protocols of the leaf-spine topology in network environment 300 are automatically configured by the SDDC manager of rack server 331 to incorporate new computing rack 303. FIG. 6 illustrates method 600 for the SDDC manager of rack server 331 configuring new computing rack 303 to operate in the L3 fabric of network environment 300. The steps of method 600 are merely exemplary of a hyper converged infrastructure like that of network environment 300. As such, not all examples will include all of the configurations discussed with respect to method 600 while some examples may include configuration steps not discussed herein. Similarly, unless one configuration needs to take place before another, the sequence described in method 600 may not be necessary.

Method 600 determines and assigns new subnets to the L3 interfaces between leaf switches 325-326 and spine switches 304-305 (601). In this example, L3 links are used to connect leaf and spine switches. The SDDC manager determines a number of new subnets needed based on information identified during the validation stage discussed above and then automatically derives new subnets depending on the state of the SDDC. The SDDC manager configures these new subnets on all the new interfaces between spine switches 304-305 and leaf switches 325-326.

Method 600 further provides the SDDC manager configuring the Border Gateway Protocol (BGP) for new computing rack 303 so that new computing rack 303 can exchange routing information for rack servers 339-342 across the L3 fabric of network environment 300 (602). BGP assigns private autonomous system (AS) numbers to individual autonomous network systems, which are computing rack 301, computing rack 302, and new computing rack 303 in this example. Since new computing rack 303 is new to network environment 300, the SDDC manager assigns a new private AS number to new computing rack 303 and provides new computing rack 303 with the BGP configuration of the L3 fabric. along with required BGP configuration. Configuring BGP exports all the private networks in new computing rack 303 to computing rack 301 and computing rack 302.

Additionally, method 600 provides the SDDC manager configuring Protocol Independent Multicast (PIM) for new computing rack 303 (603). This example uses multicast for distributing broadcast, unknown, and multicast (BUM) packets across the L3 fabric. PIM will be configured on new computing rack 303 and spine switches 304-305 to distribute BUM traffic to all racks in network environment 300. Further, the SDDC manager creates and configures VXLAN tunnels for a virtual storage area network (VSAN) within network environment 300 and public management VLANs (604). Data in tagged VLANs, like VSAN, vMotion, and management networks is tunneled in VXLAN to destination hosts through the L3 fabric. The SDDC manager creates a VNID, a multicast group (for BUM packets) for each VLAN, and updates the configuration on all the switches in network environment 300.

Also, method 600 updates a distributed logical router (DLR) executing on the rack servers of computing rack 301, computing rack 302, and new computing rack 303 to route communications between virtual machines also executing thereon with the VLANs used by the new Workload Domain (WLD) including new computing rack 303 (605). The edge systems executing on the rack servers are similarly updated. The DLR encapsulates all the data traffic leaving a host in VXLAN. Likewise, method 600 adds routes for networks in network environment 300 which are using untagged VLANs (606). VXLAN tunnels may be used to carry L2 packets in the L3 fabric of network environment 300. However, that functionality does not work for packets that do not have an associated VLAN tag. The private management network used by the SDDC is able to send such untagged packets. To distribute the untagged packets between computing rack 301, computing rack 302, and new computing rack 303, the subnet will be partitioned into multiple smaller networks, one for each rack. Routes will be added on the leaf switches to make the SDDC's private management network available on all racks.

Again, referring back to scenario 400, once the SDDC manager in rack server 331 has performed the automatic configurations of method 600 to add new computing rack 303 to the L3 fabric of network environment 300, traffic can be exchanged between computing rack 301, computing rack 302, and new computing rack 303 via spine switches 304-305 and leaf switches 325-326 of new computing rack 303. New computing rack 303 is therefore part of the L3 leaf-spine network fabric of network environment 300. Should another new computing node be connected to network environment 300, the process discussed above will repeat with respect to that new computing node to add it to the L3 fabric along with computing rack 301, computing rack 302, and new computing rack 303.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of self-expanding a Layer 3 (L3) fabric of a communication network comprising one or more spine switches having a leaf-spine topology, the method comprising:
   until a reply to one of a plurality of probe messages is received, periodically transferring the plurality of probe messages from each of the one or more spine switches to a network address from a pool of one or more network addresses reserved for discovering computing nodes to be added the L3 fabric, wherein the pool limits a number of network addresses to which probe messages are sent for discovery of the computing nodes;
   receiving the reply to one of the probe messages from a new computing node at the network address;
   in response to the reply, incorporating the new computing node into the L3 fabric, wherein incorporating the new computing node includes assigning a new network address not in the pool to the new computing node; and
   after assigning the new network address, resuming periodic transfer of the plurality of probe messages to the network address until a second reply is received to another of the plurality of probe messages from another new computing node at the network address.

2. The method of claim 1, wherein incorporating the new computing node comprises:
   ensuring, using L3 discovery protocols, that connections to one or more leaf switches of the new computing node conform to the leaf-spine topology.

3. The method of claim 1, wherein incorporating the new computing node comprises:
   checking interface state and interface speed for physical network interfaces between the one or more spine switches and one or more leaf switches of the new computing node.

4. The method of claim 1, wherein incorporating the new computing node comprises:
   configuring L3 protocols for routing communications exchanged with the new computing node.

5. The method of claim 4, wherein configuring the L3 protocols comprises:
   determining a number of new subnets needed for the new computing node; and
   assigning the new subnets to L3 links between the one or more spine switches and one or more leaf switches of the new computing node.

6. The method of claim 4, wherein configuring the L3 protocols comprises:
   configuring Border Gateway Protocol (BGP) for the new computing node;
   assigning a BGP Autonomous System (AS) number to the new computing node; and
   wherein the new computing node exports network information for private networks within the new computing node over BGP.

7. The method of claim 4, wherein configuring the L3 protocols comprises:
   configuring Protocol Independent Multicast (PIM) for the new computing node.

8. The method of claim 4, wherein configuring the L3 protocols comprises:
   creating Virtual Extensible Local Area Network (VXLAN) tunnels between the new computing node and one or more other computing nodes connected to the one or more spine switches.

9. The method of claim 4, wherein configuring the L3 protocols comprises:
   updating edge systems of the communication network and a distributed logical router for the communication network with Virtual Local Area Network (VLAN) information used with respect to the new computing node.

10. The method of claim 4, wherein configuring the L3 protocols comprises:
    partitioning a subnet including the new computing node and one or more other computing nodes connected to the one or more spine switches into one partition network for each computing node; and
    creating one or more routes between the partition network of the new computing node and the partition networks of the one or more other computing nodes, wherein the routes are used for transporting packets without Virtual Local Area Network (VLAN) tags between computing nodes.

11. A system for self-expanding a Layer 3 (L3) fabric of a communication network comprising one or more spine switches having a leaf-spine topology, the system comprising:
    one or more computer readable storage media;
    a processing system operatively coupled with the one or more computer readable storage media; and
    program instructions stored on the one or more computer readable storage media that, when read and executed by the processing system, direct the processing system to:
    until a reply to one of a plurality of probe messages is received, periodically transfer the plurality of probe messages from each of the one or more spine switches to a network address from a pool of one or more network addresses reserved for discovering computing nodes to be added the L3 fabric, wherein the pool limits a number of network addresses to which probe messages are sent for discovery of the computing nodes;
    receive the reply to one of the probe messages from a new computing node at the network address;
    in response to the reply, incorporate the new computing node into the L3 fabric, wherein incorporation of the new computing node includes assigning a new network address not in the pool to the new computing node; and
    after assigning the new network address, resume periodic transfer of the plurality of probe messages to the network address until a second reply is received to another of the plurality of probe messages from another new computing node at the network address.

12. The system of claim 11, wherein to incorporate the new computing node, the program instructions direct the processing system to:

ensure, using L3 discovery protocols, that connections to one or more leaf switches of the new computing node conform to the leaf-spine topology.

13. The system of claim 11, wherein to incorporate the new computing node, the program instructions direct the processing system to:
check interface state and interface speed for physical network interfaces between the one or more spine switches and one or more leaf switches of the new computing node.

14. The system of claim 11, wherein to incorporate the new computing node, the program instructions direct the processing system to:
configure L3 protocols for routing communications exchanged with the new computing node.

15. The system of claim 14, wherein to configure the L3 protocols, the program instructions direct the processing system to:
determine a number of new subnets needed for the new computing node; and
assign the new subnets to L3 links between the one or more spine switches and one or more leaf switches of the new computing node.

16. The system of claim 14, wherein to configure the L3 protocols, the program instructions direct the processing system to:
configure Border Gateway Protocol (BGP) for the new computing node;
assign a BGP Autonomous System (AS) number to the new computing node; and
wherein the new computing node exports network information for private networks within the new computing node over BGP.

17. The system of claim 14, wherein to configure the L3 protocols, the program instructions direct the processing system to:
configure Protocol Independent Multicast (PIM) for the new computing node.

18. The system of claim 14, wherein to configure the L3 protocols, the program instructions direct the processing system to:
create Virtual Extensible Local Area Network (VXLAN) tunnels between the new computing node and one or more other computing nodes connected to the one or more spine switches.

19. The system of claim 14, wherein to configure the L3 protocols, the program instructions direct the processing system to:
update edge systems of the communication network and a distributed logical router for the communication network with Virtual Local Area Network (VLAN) information used with respect to the new computing node.

20. The system of claim 14, wherein to configure the L3 protocols, the program instructions direct the processing system to:
partition a subnet including the new computing node and one or more other computing nodes connected to the one or more spine switches into one partition network for each computing node; and
create one or more routes between the partition network of the new computing node and the partition networks of the one or more other computing nodes, wherein the routes are used for transporting packets without Virtual Local Area Network (VLAN) tags between computing nodes.

21. The method of claim 1, wherein the one or more network addresses are a finite set of network addresses to which a plurality of probe messages, including the probe message, are transferred.

22. The system of claim 11, wherein the one or more network addresses are a finite set of network addresses to which a plurality of probe messages, including the probe message, are transferred.

* * * * *